US011912086B2

(12) United States Patent
Steinmetz et al.

(10) Patent No.: US 11,912,086 B2
(45) Date of Patent: Feb. 27, 2024

(54) SUSPENSION PRE-LOAD ADJUSTMENT SYSTEM

(71) Applicant: Polaris Industries Inc., Medina, MN (US)

(72) Inventors: Gordon J. Steinmetz, Pine Spring, MN (US); Jonathon P. Graus, Stacy, MN (US); David D. Helgeson, Roseville, MN (US)

(73) Assignee: Polaris Industries Inc., Medina, MN (US)

( * ) Notice: Subject to any disclaimer, the term of this patent is extended or adjusted under 35 U.S.C. 154(b) by 258 days.

(21) Appl. No.: 17/324,942

(22) Filed: May 19, 2021

(65) Prior Publication Data
US 2021/0268858 A1 Sep. 2, 2021

Related U.S. Application Data

(63) Continuation of application No. 16/173,249, filed on Oct. 29, 2018, now Pat. No. 11,021,031.

(51) Int. Cl.
*B60G 17/015* (2006.01)
*B60G 11/58* (2006.01)
(Continued)

(52) U.S. Cl.
CPC .......... *B60G 17/0157* (2013.01); *B60G 11/58* (2013.01); *B60G 15/063* (2013.01);
(Continued)

(58) Field of Classification Search
CPC .............. B60G 17/0157; B60G 17/019; B60G 17/021; B60G 17/0272; B60G 2202/12; B60G 2204/62; B60G 2500/30
See application file for complete search history.

(56) References Cited

U.S. PATENT DOCUMENTS 3,582,106 A 6/1971 Keijzer
3,628,810 A 12/1971 Graef
(Continued)

FOREIGN PATENT DOCUMENTS

CN 1325799 A 12/2001
CN 103802626 A 5/2014
(Continued)

OTHER PUBLICATIONS

International Search Report and Written Opinion dated Mar. 13, 2020 in corresponding PCT/US2019/058337.
(Continued)

*Primary Examiner* — Frank B Vanaman
(74) *Attorney, Agent, or Firm* — Harness, Dickey & Pierce, P.L.C.

(57) ABSTRACT

A suspension system for a vehicle and method for operating the same includes a shock absorber housing having a longitudinal axis, a spring disposed around the shock absorber housing, a retainer collar disposed around the shock absorber housing and an actuator engaged to the retainer collar. The actuator moves at least a portion of the retainer collar to move the spring in a direction corresponding the longitudinal axis. A switch generates a ride height position signal. A controller is coupled to the actuator and the switch. The controller controls a position of the actuator in response to the ride height position signal.

17 Claims, 14 Drawing Sheets

(51) Int. Cl.
*B60G 15/06* (2006.01)
*B60G 17/019* (2006.01)
*B60G 17/02* (2006.01)
*B60G 17/027* (2006.01)
*B60G 17/056* (2006.01)
*F16F 1/12* (2006.01)
*F16F 9/56* (2006.01)

(52) U.S. Cl.
CPC ......... *B60G 17/019* (2013.01); *B60G 17/021* (2013.01); *B60G 17/0272* (2013.01); *B60G 17/056* (2013.01); *F16F 1/121* (2013.01); *F16F 9/56* (2013.01); *B60G 2202/12* (2013.01); *B60G 2202/24* (2013.01); *B60G 2204/1242* (2013.01); *B60G 2204/62* (2013.01); *B60G 2300/07* (2013.01); *B60G 2300/12* (2013.01); *F16F 2228/08* (2013.01); *F16F 2230/08* (2013.01); *F16F 2230/18* (2013.01); *F16F 2236/04* (2013.01); *F16F 2238/026* (2013.01)

(56) References Cited

U.S. PATENT DOCUMENTS

| | | | |
|---|---|---|---|
| 4,364,582 A | 12/1982 | Takahashi et al. | |
| 4,720,085 A | 1/1988 | Shinbori et al. | |
| 4,830,395 A | 5/1989 | Foley | |
| 4,948,166 A * | 8/1990 | Kaneko | B60G 17/016 180/41 |
| 4,965,878 A * | 10/1990 | Yamagiwa | B60G 17/016 180/41 |
| 5,042,834 A * | 8/1991 | Yonekawa | B60G 17/016 280/5.513 |
| 5,295,563 A | 3/1994 | Bennett | |
| 5,486,018 A | 1/1996 | Sakai | |
| 5,553,836 A | 9/1996 | Ericson | |
| 5,684,698 A * | 11/1997 | Fujii | B60G 17/018 180/41 |
| 6,092,816 A | 7/2000 | Sekine et al. | |
| 7,922,181 B2 * | 4/2011 | Hakui | B60G 17/052 280/5.514 |
| 9,162,548 B1 | 10/2015 | Wakeman | |
| 2002/0089107 A1 * | 7/2002 | Koh | B60G 17/02 267/218 |
| 2002/0171187 A1 | 11/2002 | Becker et al. | |
| 2004/0195745 A1 | 10/2004 | Oliver et al. | |
| 2007/0210539 A1 * | 9/2007 | Hakui | B60G 15/063 280/124.147 |
| 2008/0243334 A1 * | 10/2008 | Bujak | B60G 17/0195 701/37 |
| 2009/0072460 A1 | 3/2009 | Michel | |
| 2012/0074660 A1 * | 3/2012 | Thomas | B60G 17/021 280/5.514 |
| 2014/0131960 A1 | 5/2014 | Moore et al. | |
| 2014/0239602 A1 * | 8/2014 | Blankenship | F16F 9/3207 280/5.515 |
| 2015/0290992 A1 | 10/2015 | Mochizuki et al. | |
| 2016/0159188 A1 * | 6/2016 | Mohamed | F16F 15/002 701/37 |
| 2017/0057591 A1 | 3/2017 | Bender et al. | |
| 2017/0080769 A1 | 3/2017 | Kurita | |

FOREIGN PATENT DOCUMENTS

| | | |
|---|---|---|
| CN | 103857544 A | 6/2014 |
| CN | 104838166 A | 8/2015 |
| CN | 107407294 A | 11/2017 |
| DE | 102013222705 A1 | 5/2014 |
| EP | 0661184 A1 | 7/1995 |
| EP | 1258374 A2 | 11/2002 |
| EP | 1743785 A1 | 1/2007 |
| FR | 3060465 A1 | 6/2018 |
| JP | 2001-080336 A | 3/2001 |
| JP | 2001-301436 A | 10/2001 |
| WO | WO-2006/012858 A1 | 2/2006 |

OTHER PUBLICATIONS

Chinese Office Action dated Apr. 24, 2022 in corresponding Chinese Application No. 201980071919.0 (8 pages).

* cited by examiner

SUSPENSION PRE-LOAD ADJUSTMENT SYSTEM

CROSS-REFERENCE TO RELATED APPLICATION

This application is a continuation of U.S. patent application Ser. No. 16/173,249 filed on Oct. 29, 2018. The entire disclosure of the above application is incorporated herein by reference.

FIELD

The present disclosure relates to a suspension for a vehicle and, more particularly, to a suspension that allows a spring position of the suspension to be adjusted.

BACKGROUND

This section provides background information related to the present disclosure which is not necessarily prior art.

Motorcycles and all-terrain vehicles use a suspension that includes shock absorbers and various linkages that are typically fixed in position relative to each other. Preloading the shock absorbers is one area that adjustment may be performed. In many cases the amount of preload is fixed for all conditions. The preload of a spring of the suspension refers to the amount of compression that the spring is compressed. The spring is typically located around a shock absorber and is compressed the preload amount when no weight is in the vehicle. Because vehicles are used for different purposes at different times, having one preload setting may not provide optimum driving conditions for various operating conditions. For example, the addition of multiple riders or a heavy load may require a change in the preload to compensate for the added weight. The amount of preload may be a personal preference so that a particular handling or drivability characteristics of the vehicle is achieved.

Adjusting the preload of a vehicle may be done by using a special wrench or tool to adjust a collar and set the spring to the desired preload. However, this process is cumbersome and must be performed using an unloaded vehicle. Because of the difficult process, the adjustment of a preload is rarely performed. However, vehicles are used in various conditions and thus a more rapid method for adjusting the preload is desirable.

SUMMARY

This section provides a general summary of the disclosures, and is not a comprehensive disclosure of its full scope or all of its features.

The present disclosure provides a system to spring pre-load for a suspension to be readily adjusted.

In one aspect of the disclosure, a suspension system for a vehicle includes a shock absorber housing having a longitudinal axis, a spring disposed around the shock absorber housing and a retainer collar disposed around the housing. An actuator coupled to the retainer collar moves at least a portion of the retainer collar to move the spring in a direction corresponding the longitudinal axis.

In another aspect of the disclosure, a method of controlling a suspension system of a vehicle having a shock absorber housing having a longitudinal axis, a spring disposed around the shock absorber housing and a retainer collar disposed around the shock absorber housing includes electrically or hydraulically controlling at least a portion of the retainer collar to move in a longitudinal direction and moving the spring in the longitudinal direction in response to moving the retainer collar.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

DETAILED DESCRIPTION

Example embodiments will now be described more fully with reference to the accompanying drawings. Although the following description includes several examples of a motorcycle application, it is understood that the features herein may be applied to any appropriate vehicle, such as snowmobiles, all-terrain vehicles, utility vehicles, moped, automobiles, scooters, etc. The examples disclosed below are not intended to be exhaustive or to limit the disclosure to the precise forms disclosed in the following detailed description. Rather, the examples are chosen and described so that others skilled in the art may utilize their teachings.

Figure 1:
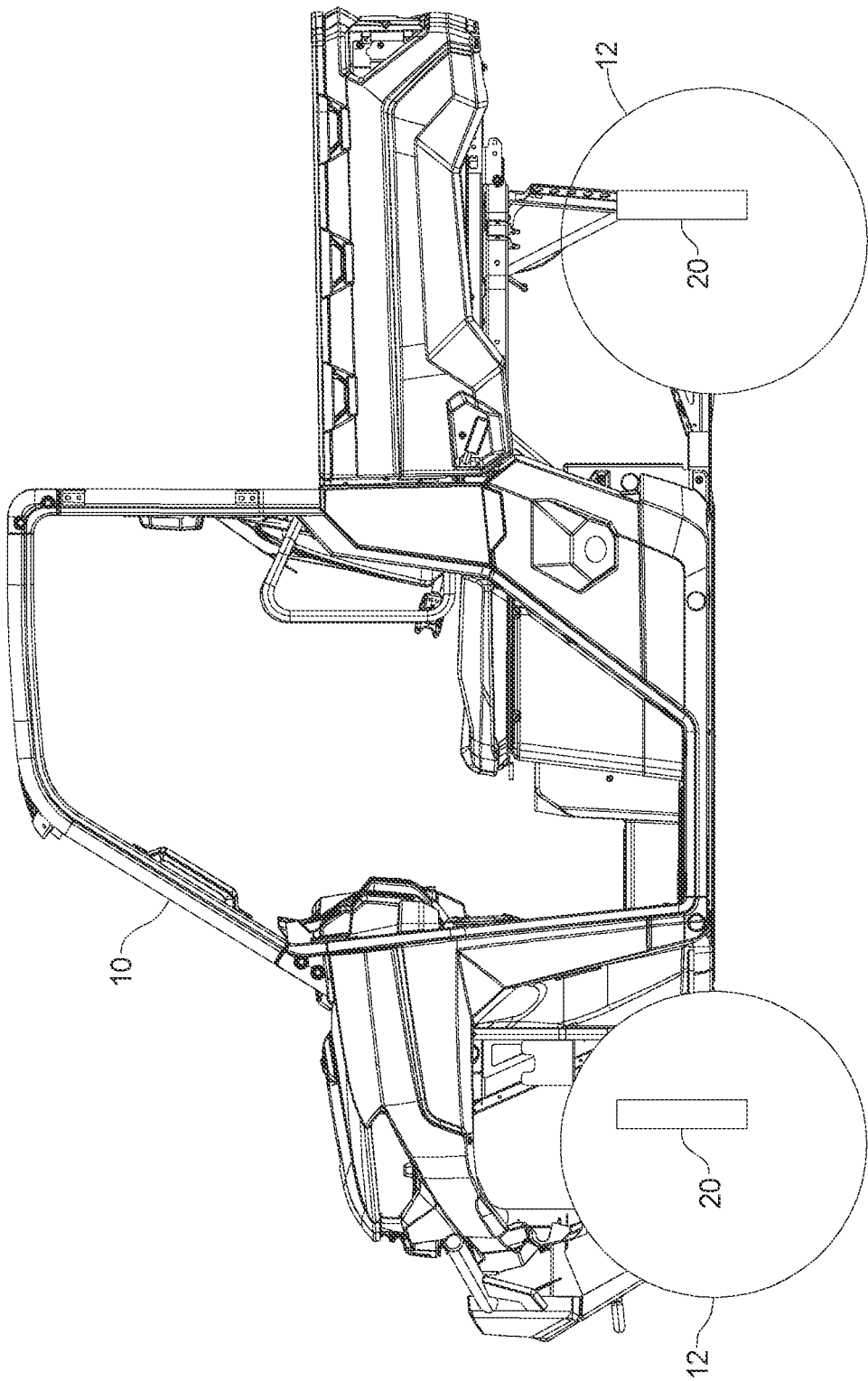
FIG. 1 is a perspective view of a utility vehicle having a suspension system according to the present disclosure.

Referring now to FIG. 1, a vehicle 10 such as a utility vehicle is illustrated as having wheels 12 and a suspension system 20 that is used for movably coupling the wheels 12 to the vehicle 10. The vehicle 10 is illustrated as a utility vehicle, however, the present disclosure is also applicable to other types of vehicles including motorcycles, side-by-sides, snowmobiles and the like. The wheels 12 may also be replaced by skis or tracks. The suspension system 20 is adjustable as will be further described below. That is, the ride height of the vehicle relative to the wheels 12 may be adjustable so that the spring of the suspension system 20 is preloaded a desired amount.

Referring now to FIG. 2, the suspension system 20 is illustrated in further detail in block diagrammatic form. The suspension system 20 includes a shock absorber 210, a spring 212 and a retainer collar 214. The shock absorber 210 is coupled to the vehicle 10 and has the spring 212 therearound. The retainer collar 214 is used to hold the spring 212 in a partially compressed preloaded position relative to the shock absorber 210 and particularly relative to the working ends of the shock absorber 210. An actuator 216 is coupled to the retainer collar 214 to allow the retainer collar 214 to be moved into the desired preloaded position. As mentioned above, the process of moving the retainer collar 214 using the actuator 216 in an easy process and the configuration of which will be described in more detail below. A controller 218 used in some examples may be used to control the movement of the actuator 216 which in turn controls the movement of the retainer collar 214. The controller 218 may be an electronic circuit formed of discrete components or a microprocessor-based system. The controller 218 may be a central vehicle controller or may be dedicated to the operation of the actuator 216 or suspension system.

The controller 218 is in communication with a screen display 220 such as by a controller area network bus. The screen display 220 may have a virtual switch 222 displayed thereon for controlling the operation of the actuator 216. Other configurations of virtual switch 222 may be evident to those in the art. The virtual switch 222 may be implemented in various ways including as a "+" or a "−" symbol to signify increasing or decreasing the preload height (lengthen or shorten the spring preload length, respectively) or as words "lengthen" or "shorten" under a "preload" category. Alternatively, physical switches could also be used as further discussed herein.

The controller 218 may also be coupled to an atmospheric pressure sensor 230 generating an atmospheric pressure signal, an atmospheric temperature sensor 232 generating an atmospheric temperature signal and a load sensor 234 generating a vehicle load signal. By providing the sensors 230, 232, 234, the controller 218 may automatically control the actuator 216 or motor to rotate or move the retainer collar 214 into a desired position and to have a desired preload of the spring 212 relative to the shock absorber 210 based on the atmospheric pressure, atmospheric temperature or the load of the vehicle. By monitoring the operating environment in which the vehicle is operated, the controller 218 may allow for adjustments to be made during operation of the vehicle based on one or more of the atmospheric pressure signal, the atmospheric temperature signal or the vehicle load signal.

A discrete mechanical switch 236 such as a mechanical switch may also be in communication with the controller 218. The discrete switch 236 may provide a signal to allow the controller 218 to adjust the actuator 216 to change the position of the retainer collar 214 in a desired manner. The discrete switch 236 may be in a position to allow the vehicle 10 to operate or change the position of the retainer collar 214 during operation of the vehicle 10. A rocker switch is a suitable example of the discrete switch 236. Both the virtual switch 222 and discrete switch 236 allow the vehicle operator to change the preload of the spring 212 during operation of the vehicle. In response, the handling or operating characteristics of the vehicle suspension may be easily changed.

An inertial measurement to unit (IMU) 238 may also me in communication with the controller 218. The IMU 238 may include various inertial sensors such as three axis of acceleration sensors and three moments around the three axis. The inertial measurement unit 238 may allow the ride height to change based upon the output of the inertial measurement unit 238. The inertial measurement unit 238 sense the operating conditions of the vehicle.

A shock position sensor 240 may also be in communication with the controller 218. The shock position sensor may provide a signal that corresponds to the position of the shock. That is, a signal corresponding to the relative position or extension of the shock may be generated by the shock position sensor. The controller 218 may use the shock position sensor to set or adjust the ride height based upon the operating conditions. A vehicle mode sensor 242 may also sense the state or setting of the vehicle. The dynamic state or desired switch setting of the vehicle mode may provide an input to the controller 218 which in turn adjusts the ride height to correspond to the acceptable or desired vehicle mode as sensed by the vehicle mode sensor 242 or switch setting.

A shock temperature sensor 244 may also be in communication with the controller 218. The controller 218 may adjust the ride height based upon the temperature sensed within the shock absorber. The shock temperature sensor 242 may correspond to the vehicle loading. As well, the shock position sensor 240 may also correspond to the vehicle loading.

A mechanical pressure release switch 246 may also be in communication with the retainer collar 214. As will be discussed in further detail below, a mechanical pressure release switch 246 may allow any hydraulic pressure to be relieved from the retainer collar 214 to allow the retainer collar 214 to be positioned in a desirable location. Details of the mechanical pressure release switch 246 and the fluid path associated therewith are set forth relative to FIGS. 6-8 below.

A timer 248 may also be coupled to the controller 218. The timer 248 may be used to time various events as the amount of time for raising or lowering the suspension into various positions. The output of the timer may be used to control a status indicator as will be set forth further below in FIG. 2C.

Figure 2A:
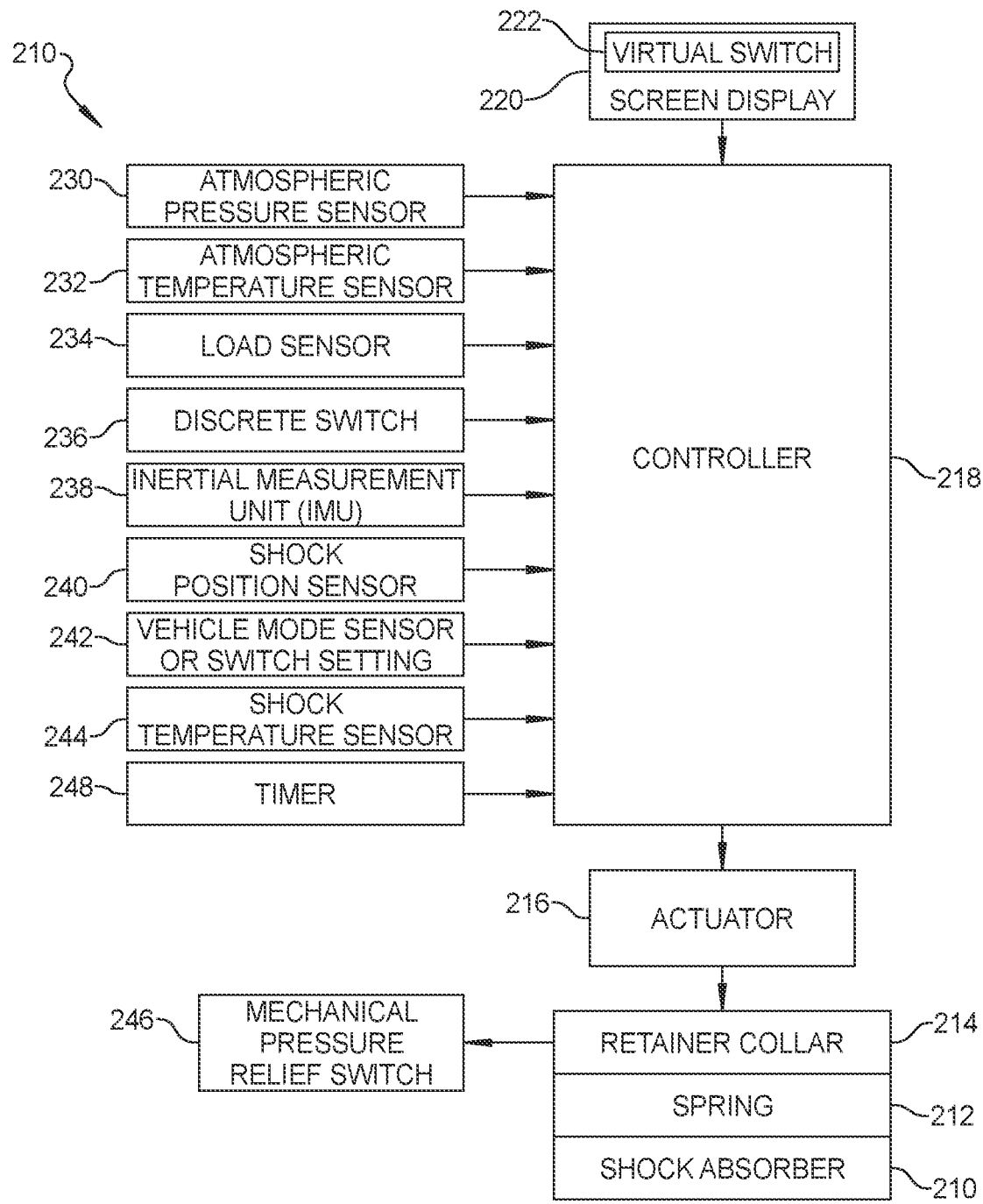
FIG. 2A is a block diagrammatic view of an adjustable suspension system according to the present disclosure.
Figure 2B:
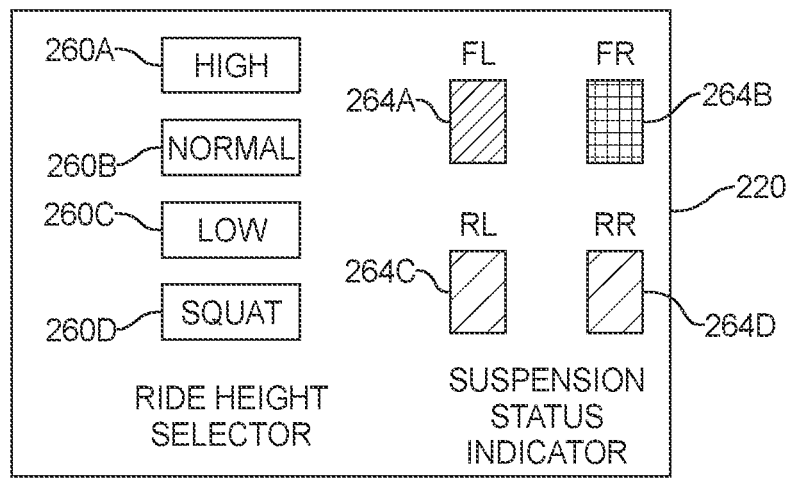
FIG. 2B is representation of a screen display for virtual switches for selecting the ride height and a suspension status indicator.

Referring now to FIG. 2B the display 220 is illustrated in further detail. In this example the display 220 illustrates a plurality of virtual switches. Virtual position switches 260A-260D are used for selecting the ride height. In this example a high position is set by switch 260A, a normal position is set by 260B, a low position is set by switch 260C, and a squat or very low position is set by switch 260D. The squat switch 260D may be suitable for various types of applications including shipping the vehicle in which the lowest profile of the vehicle and thus the suspension may be desirable.

A plurality status indicators 264A-264D may be used on the same screen as the ride height selector or a separate screen display. The status indicators 264A-264D are used to indicate the status of the various suspension components at each of the corners of the vehicle. In this example, the status of the front left suspension is indicated by status indicator 264A. The status of the front right suspension is indicated by the status indicator 264B. The status of the rear left is indicated by the status indicator 264C and the status of the rear right suspension is indicated by the status indicator 264D. In this example status indicators 264A, 264C, and 264D are indicating a first indication. The indication may correspond to a color or other type of shading. Indicators 264A-264D are indicating a normal status while the status indicator 264B is different and thus indicates a problem at the front right suspension. The suspension may default to certain position when detecting a fault at one or more corners of the vehicle.

Figure 2C:
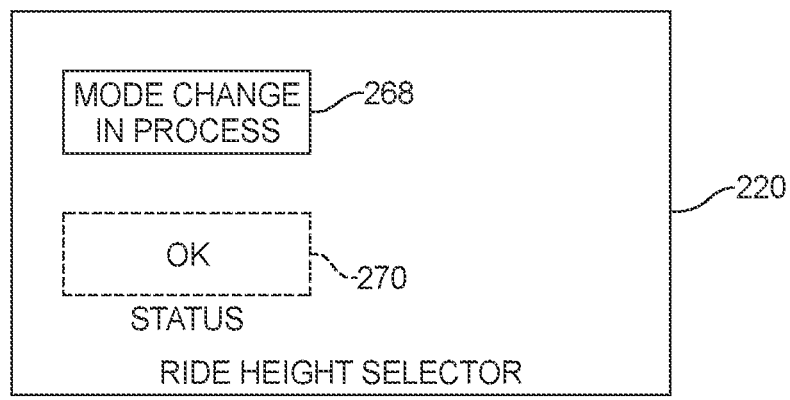
FIG. 2C is a screen display for indicating the status of a suspension change.

Referring now to FIG. 2C, the screen display 220 may generate the illustrated screen display after one of the ride height selectors 260A-260D is selected. In this example, it takes a finite amount of time for the suspension to react either electrically or hydraulically to the selection of one of the ride height selectors 260A-260D. The timer of FIG. 2A may be used to count the time until the desired suspension position is reached. Feedback from a shock position sensor or ride height position sensor may also be used to determine when the desired suspension position has been reached. In this example two indicators 260A indicating "mode change in progress" and a second indicator indicating the status is ok at the box 270 is set forth. The mode change in process box 260A may be illuminated or otherwise highlighted to indicate that a change in the system suspension has been requested and is in the process of being performed. Box 270 may provide an indication that the suspension is in the selected ride height.

Figure 2D:
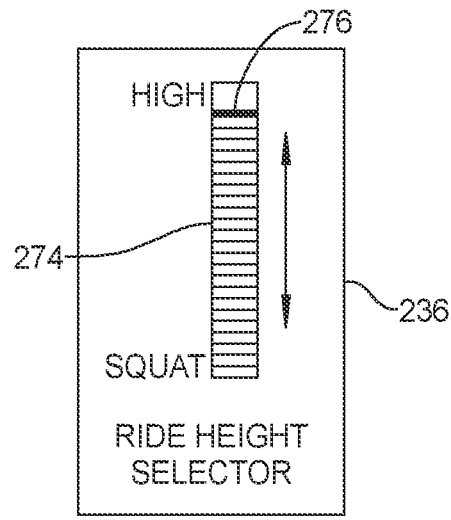
FIG. 2D is an example of a discrete switch.

Referring now to FIG. 2D, a switch 236 such as a slide dial 274 may be implemented. In this example the position of the suspension may be infinitely variable. By adjusting the slide dial 274 into the desired position, which, as illustrated is in the high position that suspension may react accordingly. An indicator 276 on the slide dial 274 may be positioned by moving the slide dial into the desired position.

Figure 2E:
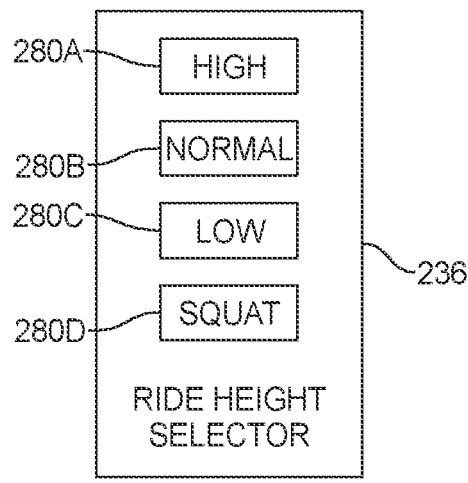
FIG. 2E is a second example of a plurality of discrete switches for setting the ride height.

Referring now to FIG. 2E the ride height selector may also be a series of discrete switches 280A-280D in this example. The switches 280A-280D correspond respectively to a high suspension position, a normal suspension position, a low suspension position, and a squat suspension position.

Figure 2F:
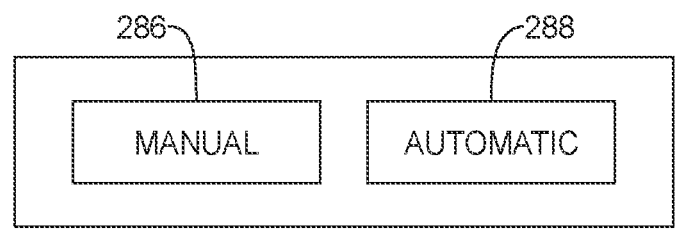
FIG. 2F is a representation of either virtual or discrete switches for manually or automatically selecting the ride height.

Referring now to FIG. 2F, the suspension may be automatically set (based or load or other sensed conditions) or manually set by either discrete or virtual switches. In FIG. 2F a manual switch 286 may be used by the operator to manually select the desired ride height using the discrete or virtual switches illustrated in FIGS. 2B, 2D and 2E. In FIG. 2F an automatic switch 288 may be selected to automatically select the ride height based upon various sensed conditions such as the load sensor output, the shock temperature sensor and or the shock position sensor.

Figure 3A:
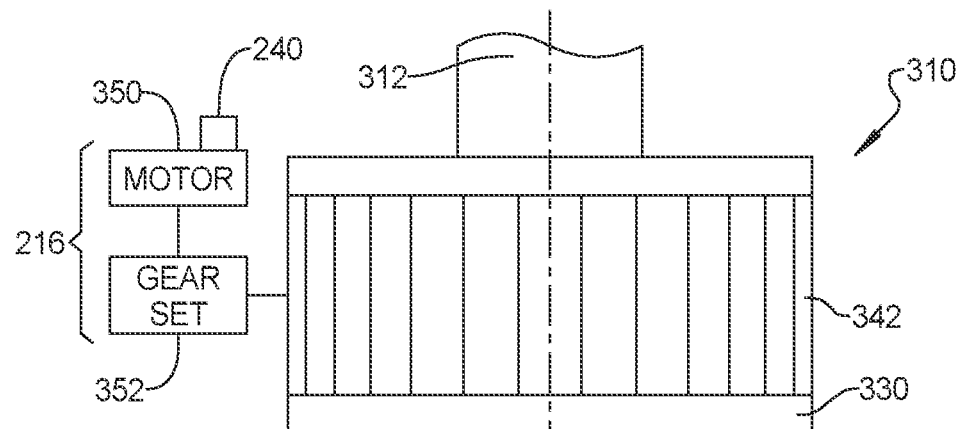
FIG. 3A is a side view of a suspension pre-load adjustment system according to the present disclosure.
Figure 3B:
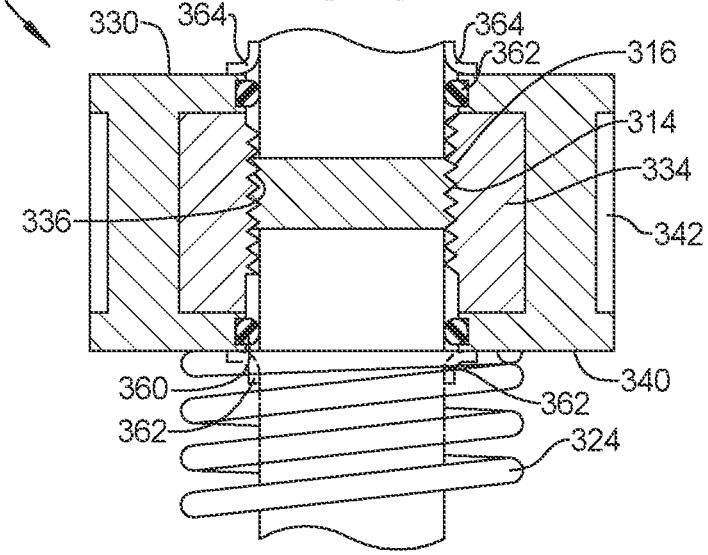
FIG. 3B is a cross-sectional view of the adjustment system illustrated in FIG. 3A.

Referring now to FIGS. 3A and 3B, a first example of a suspension system 310 is illustrated in further detail. In this example a shock absorber 312 has external threads 314 disposed on the housing 316. The housing 316 is generally cylindrical and the external threads 314 extend therearound. The shock absorber 312 is hydraulically filled and has a piston arm 318 extending from the housing 316. The piston arm 318 has a mount 320 for movability to a suspension component and a spring flange 322.

A spring 324 is directly adjacent to the spring flange 322 and extends in a direction corresponding to the longitudinal axis 326 of the shock absorber 312 which, in turn, corresponds with the piston arm 318 and the housing 316.

The spring 324 extends between the spring flange 322 and a retainer collar 330. The retainer collar 330 as illustrated best in FIG. 3B, comprises a retainer housing 332 that encloses a bearing surface 334. The bearing surface 334 comprises internal threads 336 that engage the external threads 314 disposed on the housing 316. Bottom or first surface 340 of the retainer housing 332 pushes against the spring 324 and allows the spring 324 to expand or contract based upon the position of the retainer collar 330.

The retainer collar 330 has teeth or external threads 342. The external threads 342 engage the actuator 216 which, in this example is a motor 350 and a gear set 352. The motor 350 engages gears at the gear set 352 to engage the threads 342 on the external surface of the housing 332. The rotational movement of the motor 350 is thus translated to a rotational movement of the bearing surface 334 by the gear set 352 as the housing 332 rotates around the housing 316 of the shock absorber 312. The shock position sensor 240 provides feedback to allow the motor 350 to be adjusted properly.

A pair of seals 360, 362 may be disposed between the housing 332 and the housing 316 of the shock absorber 312. This may reduce the amount of contaminants disposed within the external threads 314 and the internal threads 336.

Figure 5A:
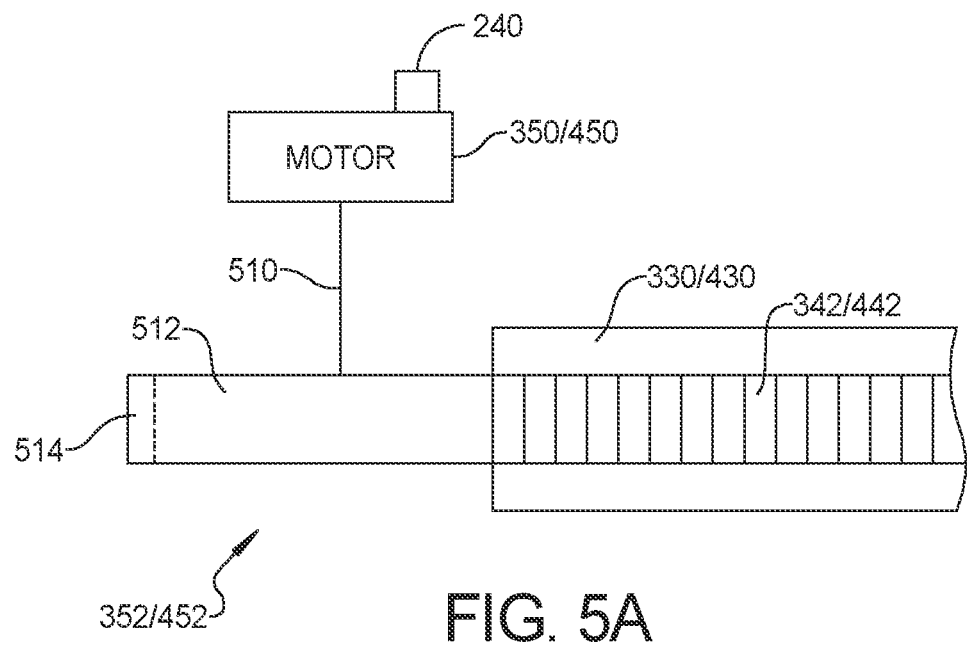
FIG. 5A is a side view of one type of gear set for the adjustment system illustrated in FIGS. 3A and 3B.
Figure 5B:
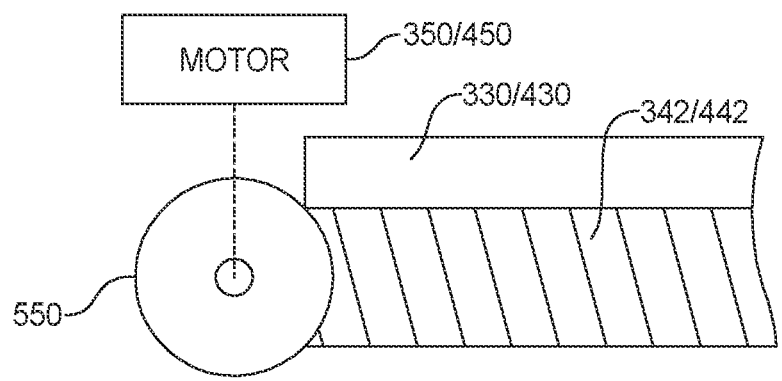
FIG. 5B is an alternate side view of a gear set for an adjustment system.

The gear set 352 is described in further detail in FIGS. 5A and 5B. The gear set 352 may be one of a number of types of gear sets available to rotatably move the retainer collar 330 around the housing 316 of the shock absorber 312.

A plurality of external seals 362 and 364 may also be coupled between the retainer collar 330 and the shock absorber 312. That is, a wiper type seal mounted to the shock absorber 312 or to the retainer collar 330 may be used. The other end of the seals 362 and 364 may be free so that the seals 362, 364 take up the position and allows the shock absorber surface to remain clean and thus a reduction in the potential for fouling the threads 336 is achieved.

It also should be noted that the retainer collar 330 and the parts therein could rotate. In addition or instead of the bearing surface 334 or the external threads 342 moving.

Figure 4:
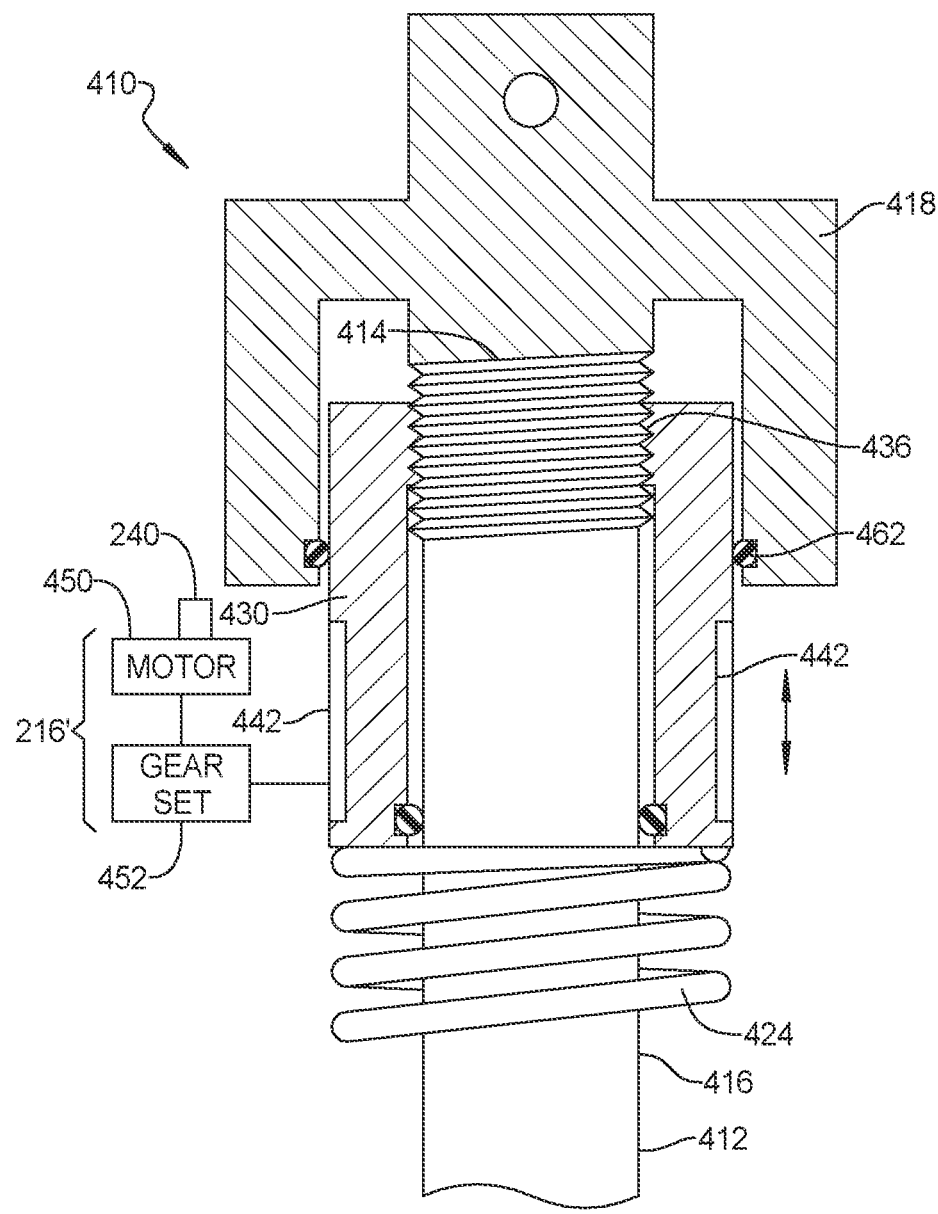
FIG. 4 is a side partial cross-sectional view of an alternate preload adjustment system.

Referring now to FIG. 4, another example of a suspension system 410 is set forth. In this example, the shock absorber 412 has external threads 414 on the housing 416. The housing 416 has a downwardly extending flanged extension 418 that slidably receives the retainer collar 430. The flanged extension 418 extends toward the arm end of the shock absorber (the end opposite the flanged extension 418). The retainer collar 430 has internal threads 436 that engage the external threads 414 to move the retainer collar 330 in an upward and downward position or from a first position to a second position. A motor 450 and gear set 452 are used to engage external threads 442 disposed on the retainer collar 430 to rotate the retainer collar 430 and thus move the retainer collar 430 in a longitudinal direction relative to the shock absorber 412. Seals 460 and 462 may be used to seal the retainer collar 330 to the housing 416.

Referring now to FIG. 5A, the motor 350/450 is illustrated in further detail relative to the gear set 352/452. In this example, the motor rotates a shaft 510 which in turn rotates a spur gear 512 that has teeth 514 that engage the external threads 342/442 as illustrated above.

Referring now to FIG. 5B, a worm gear 550 is coupled to the motor 350/450. The worm gear 550 engages external threads 342 on the retainer collar 330/430. In the examples of FIG. 5A and FIG. 5B, the motor 350/450 rotates the gear to rotate the retainer collar 330 around the longitudinal axis of the shock absorber housing 316/416 so that the retainer collar 330/430 moves in an axial direction up and down the housing 316/416.

Figure 6:
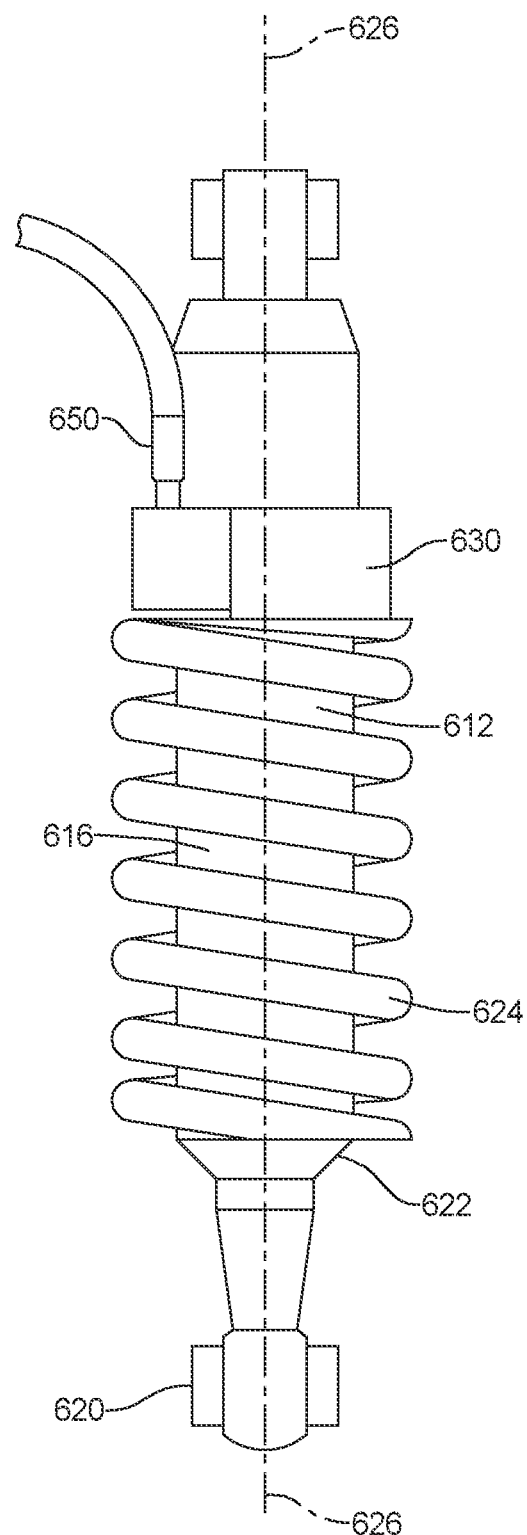
FIG. 6 is a perspective view of a suspension system having an alternate configuration to that illustrated in FIGS. 3A and 4.

Referring now to FIG. 6, a hydraulically actuated example is set forth. A shock absorber 612 having a housing 616 is illustrated having a pair of mounts 620. A spring flange 622 is also illustrated. A hydraulic retainer collar 630 is disposed around the housing 616 and may be positioned in various positions longitudinally relative to the longitudinal axis 626 of the shock absorber 312. In this example, the retainer collar 630 is hydraulically actuated through a hydraulic inlet port 650 which will be further described below.

Figure 7:
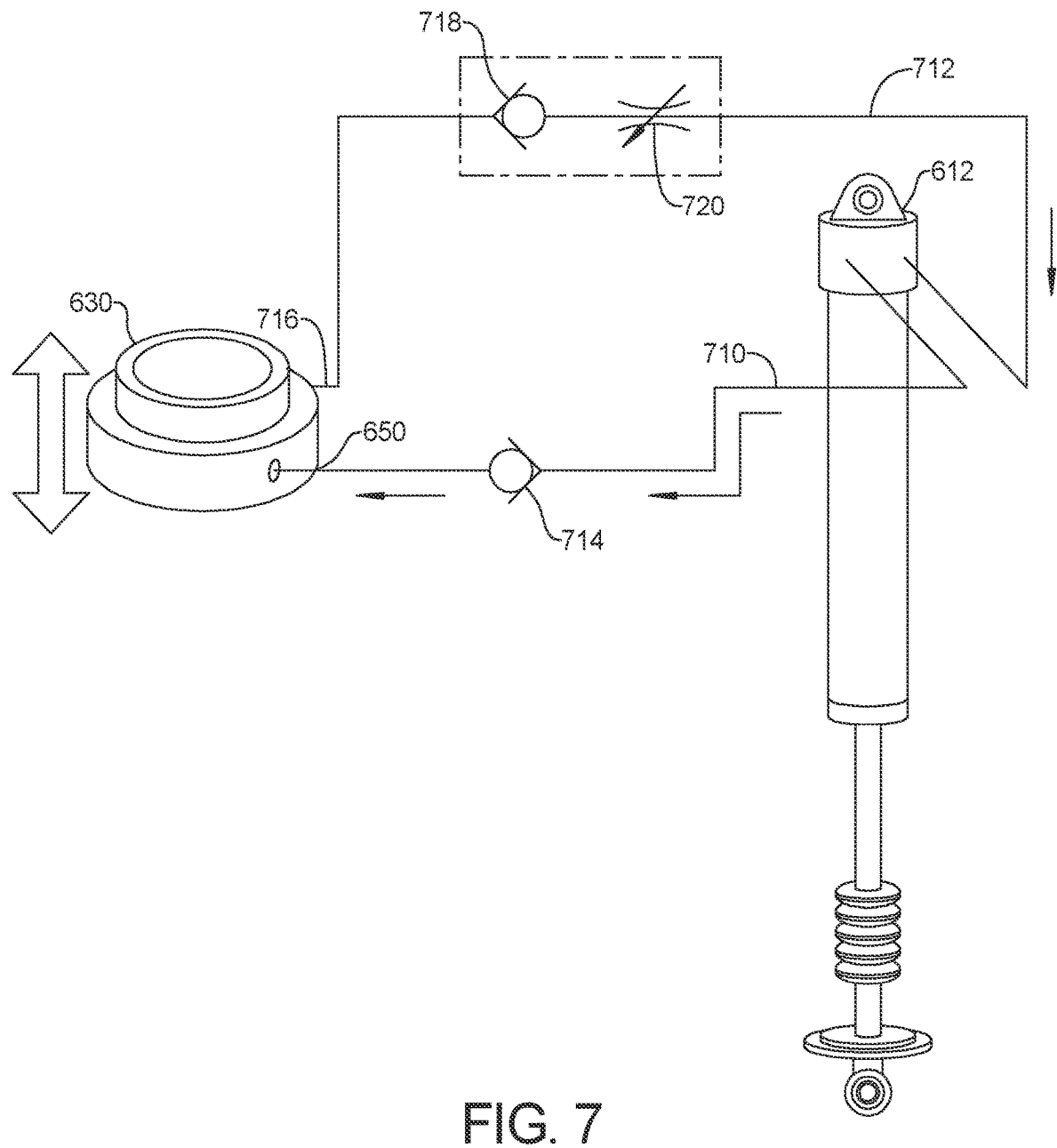
FIG. 7 is a systematic view of the adjustable suspension system of FIG. 6.

Referring now to FIG. 7, a simplified schematic view of the hydraulic circuit of the hydraulic retainer collar 630 is illustrated. In this example, shock absorber 612 is illustrated as a separate component for simplicity. The shock absorber 612 has an outlet port 710 and an inlet port 712. The shock absorber 612 is in communication with the retainer collar 630 between the outlet port 710 and the inlet port 650 through a check valve 714. The check valve 714 prevents reverse flow from the hydraulic inlet port 650 into the outlet port 710.

The retainer collar 630 may also have an outlet port 716 disposed thereon. The outlet port 716 may communicate hydraulic fluid from the retainer collar 630 to the inlet port 712 of the shock absorber 612. A check valve 718 may be disposed in parallel with a relief valve or electronic bypass switch 720. In operation, when the shock absorber 612 compresses, the oil pressure fills up the retainer collar 630. On extension of the shock absorber 612, the oil within the shock absorber 612 may bleed out through the electronic bypass switch 720. Although the switch 720 is described as an electronic switch or valve, a manual pressure relief switch may be used in its place.

Figure 8A:
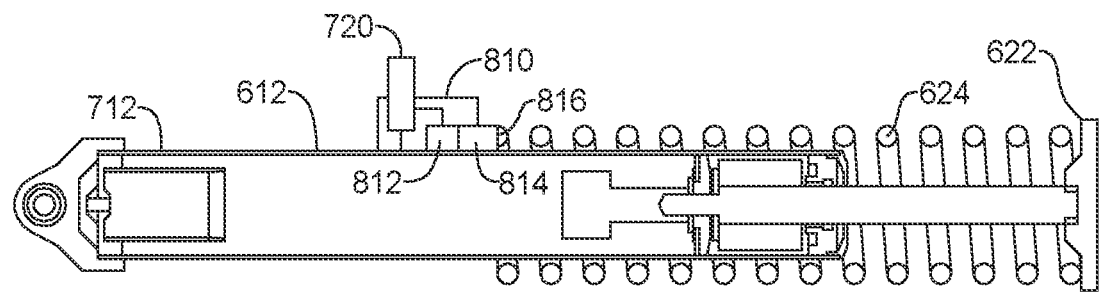
FIG. 8A is a cross-sectional view of the adjustable suspension system of FIG. 6.
Figure 8B:
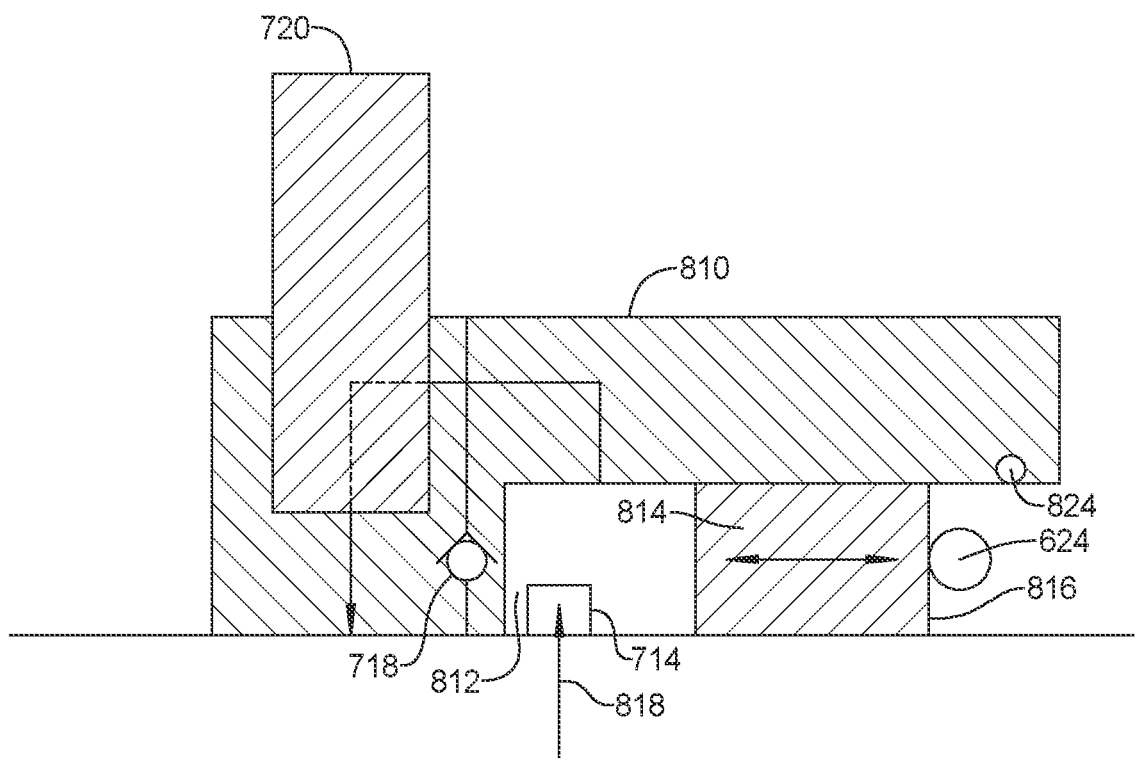
FIG. 8B is an enlarged cross-sectional view of the retainer collar of FIG. 8A.

Referring now to FIGS. 8A and 8B, a cross-sectional view of the shock absorber 612 is set forth. In this example, the retainer collar 630 is illustrated in further detail. In this example, the retainer collar 630 has a first portion 810 that is fixed to housing 616 of the shock absorber 612. A hydraulic cavity 812 is formed by the first portion 810 and a second portion 814 that is received within the hydraulic cavity 812 of the first portion 810. Second portion 814 moves in a longitudinal direction relative to the first portion based upon the pressure of the hydraulic fluid that is in the hydraulic cavity 812. That is, the more the hydraulic fluid pressure rises, the further the second portion 814 extends from the hydraulic cavity 812. A bearing surface 816 is disposed on the second portion 814 and moves the spring 624 in a longitudinal direction so that the longitudinal length of the spring is shortened or lengthened. The operation of the second portion 814 relative to the first portion 810 is performed by the difference in hydraulic pressure within the hydraulic cavity 812. As an increased amount of hydraulic fluid is communicated to the hydraulic cavity 812 from the shock absorber through the port 818 (which may include the one-way check valve 714), the second portion 814 extends outward from the hydraulic cavity 812. As the amount of pressure within the hydraulic cavity 812 is reduced, the amount of extension of the second portion 814 outside the hydraulic cavity 812 is reduced. A snap ring 824 may restrict the movement of the second portion 814 from extending too far.

In operation, the retainer collar in all examples is controllably moved. That is the movement of at least a portion of the retainer collar is electrically or hydraulically controlled to move in a longitudinal direction. The spring is moved in the longitudinal direction in response to moving the retainer collar. The movement corresponds to the desired preload or preload height for the suspension and thus the vehicle. The vehicle is then operated with the suspension at the preload setting until another change is commanded by the vehicle owner.

Figure 9A:
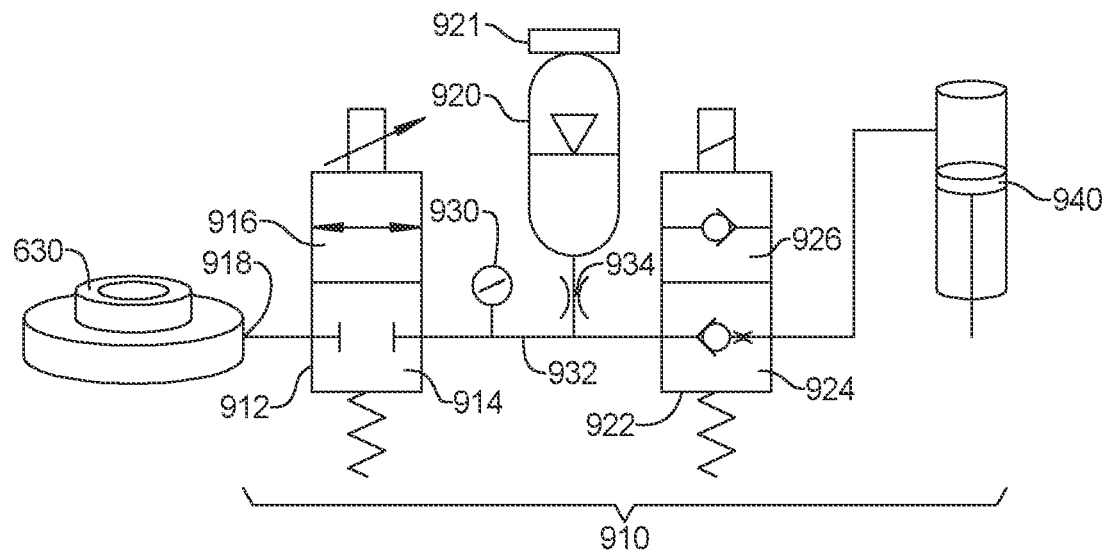
FIG. 9A is a schematic view of another example for a hydraulic circuit according to the present disclosure.

Referring now to FIG. 9A the retainer collar 630 is illustrated in fluid communication with a hydraulic circuit 910. The hydraulic circuit 910 includes a first valve 912 having a first position 914 and a second position 916. The first position 914 corresponds to an open valve position in which hydraulic fluid is not flowing through the valve. The second position 916 corresponds to a position where hydraulic fluid is communicated through the valve. The valve in fluid communication with a hydraulic port 918 of the hydraulic retainer collar 630. The port 918 allows fluid into or out of the hydraulic retainer collar 630.

The valve 912 is in fluid communication with an accumulator 920. The accumulator has a bleed valve 92 that may be controlled to relieve the pressure therein as described below. Accumulator 920 is disposed between the first valve 912 and a second valve 922. The second valve 922 has a first position 924 in which a check valve allows fluid to communicate through the valve toward the accumulator 920. A second position 926 of the valve 922 allows fluid to be communicated from the accumulator 920 through a pressure sensor 930 is used to monitor the amount of pressure available at the accumulator 920 and that is present within the hydraulic line 932 which communicates fluid between the first valve 912 and the second valve 922 and also includes the hydraulic accumulator 920. A nozzle 934 may be used to couple the accumulator 920 to the hydraulic line 932 to restrict the flow therethrough. The nozzle 934 may be fixed or may be variable.

The second valve 922 is in fluid communication with shock absorber 940.

Figure 9B:
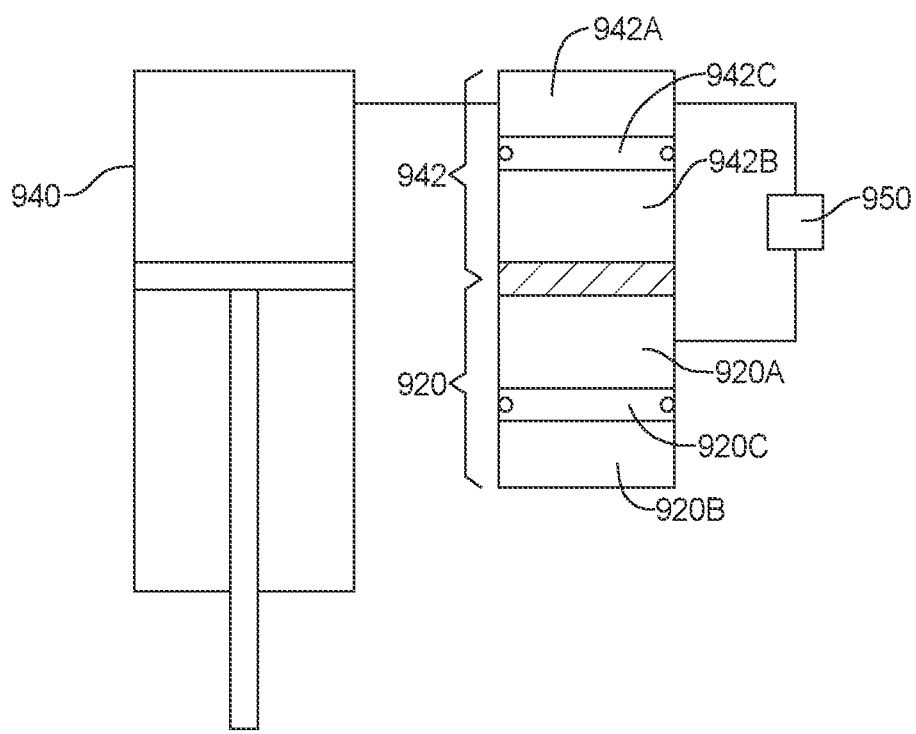
FIG. 9B is one example of a position of an accumulator.

Referring now to FIG. 9B, the shock absorber 940 is illustrated with respect to one practical example of the circuit of FIG. 9A. The shock absorber 9A has a shock absorber reservoir 942 that consists of a hydraulic fluid portion 942A and a gas portion 942B. The piston 942C separates the hydraulic fluid 942A from the gas portion 942B. The accumulator 920 may also be implemented within the shock absorber. The accumulator section may also comprise a hydraulic portion 920A and a gas portion 920B each of which are separated by a piston 920C. The first valve 912 and the second valve 922 are referred to as "the valving" 950, which is illustrated by a box in FIG. 9B.

Figure 9C:
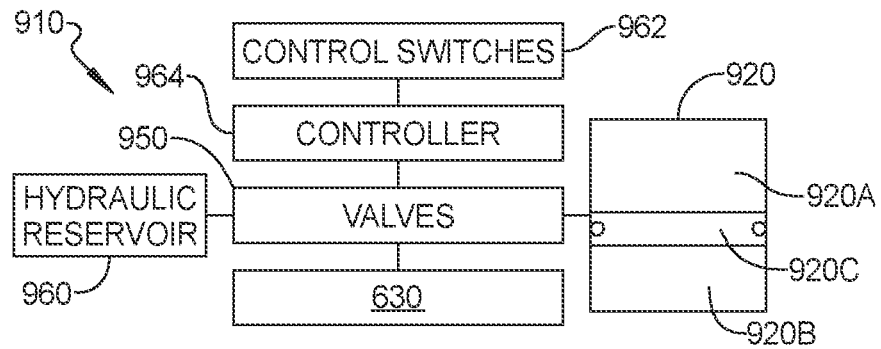
FIG. 9C is a block diagrammatic view of a hydraulic circuit having an external shock reservoir and accumulator.

Referring now to FIG. 9C hydraulic circuit 910 illustrated in FIG. 9A may also comprise a separate hydraulic reservoir 960 separated from the accumulator 920 and the shock absorber. In this example the valving 950 is in position between the hydraulic reservoir 960 and the accumulator 920 to control the amount of hydraulic fluid communicated thereto and therefrom. Control switches 962 are in communication with a controller 964. The controller 964 in conjunction with input from the control switches 962 control the valves 950 to the various positions.

Figure 9D:
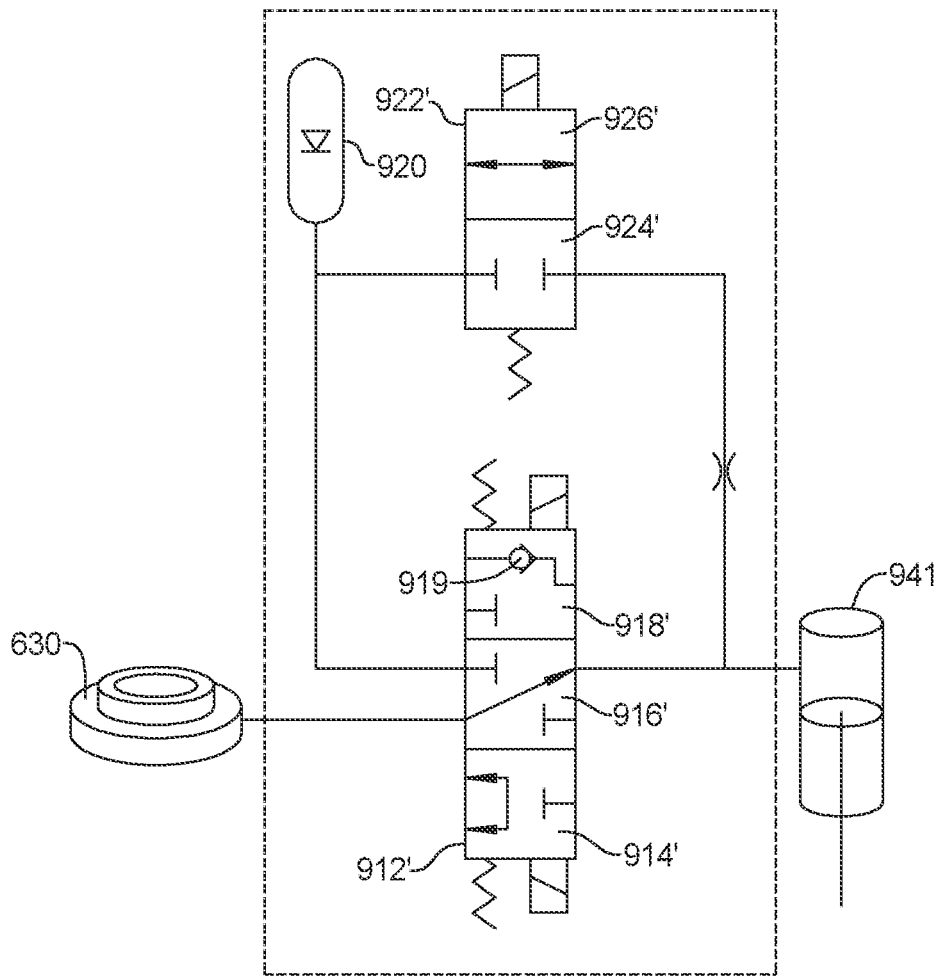
FIG. 9D is a schematic of an alternative valve configuration for operating the system.

Referring now to FIG. 9D, the accumulator 920, the hydraulic retainer collar 630 and the reservoir 941 which may be implemented in the shock absorber 940 are all illustrated as in FIG. 9B. However, the switching circuit has been modified in which the first valve 912 has been modified to a three-way valve 912'. The three-way valve has a first position 914' a second position 916' and a third position 918'. The first position 914' connects the accumulator 920 to the hydraulic retainer collar 630 so that the vehicle is raised. In the second position 916' the vehicle is lowered by connecting the hydraulic retainer collar 630 to the reservoir 941. In the third position 918', a check valve allowing fluid to flow between the reservoir 941 and the accumulator 920 is in fluid communication. The check valve 919 prevents fluid from flowing from the accumulator 920 toward the reservoir 941.

In FIG. 9D the second valve 922 has a first position 924' the valve is open and thus the accumulator 920 is not in communication with the reservoir 941. In position 926' the valve allows communication between the reservoir 941 and the accumulator 920 valve position 926' allows the accumulator 920 to discharge if required. Position 914' allows the vehicle to be raised, position 916' allows the vehicle to be lowered and position 918' allows the accumulator to be charged.

Figure 9E:
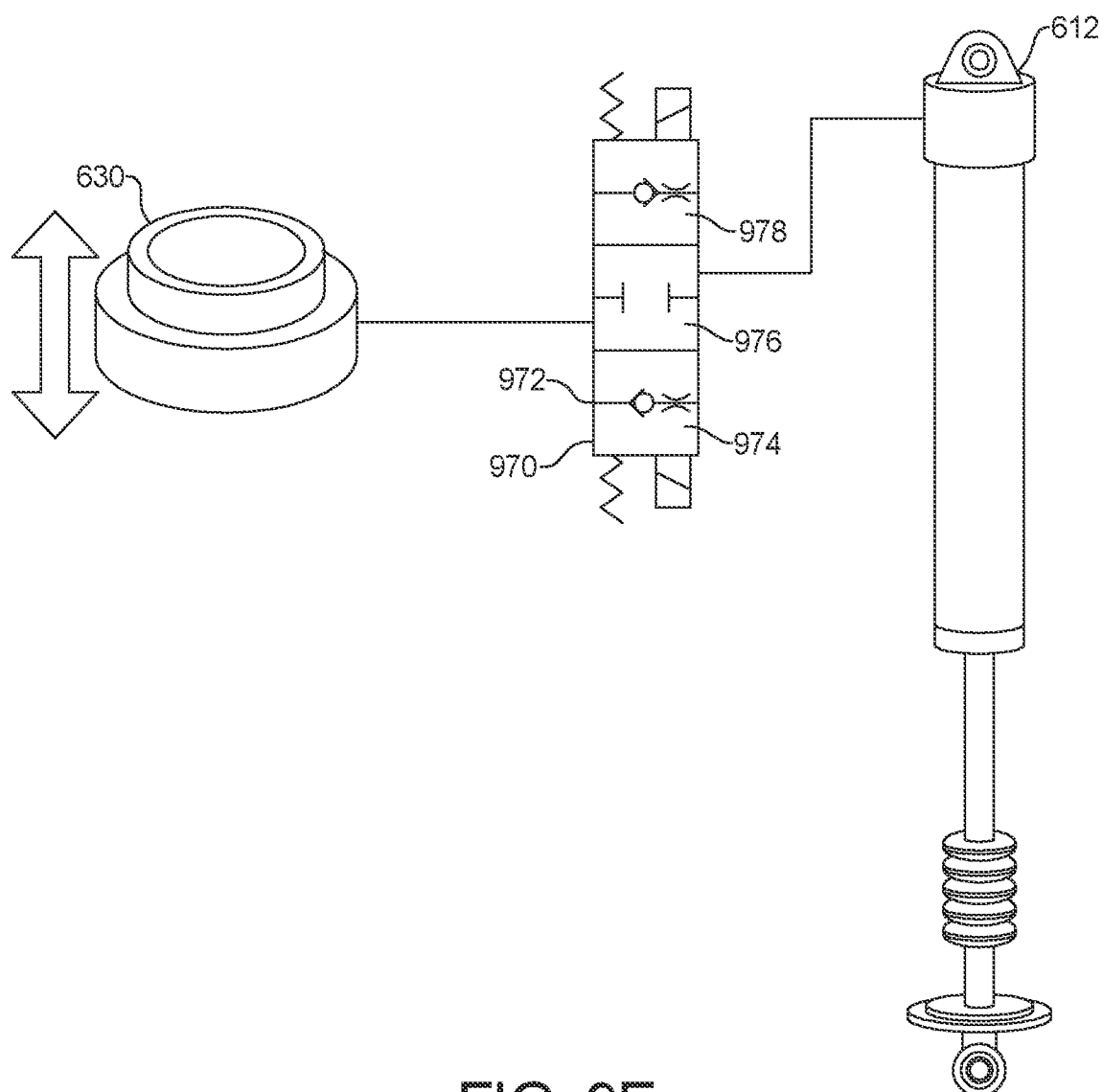
FIG. 9E is another valve configuration for operating the system.

Referring now to FIG. 9E, a valve 970 is set forth. Valve 970 has a first position 972 that includes a check valve 974 that allows fluid to communicate from the shock absorber 612 to the hydraulic retainer collar 630. In position 976 the system is open and hydraulic communication between the shock absorber 612 and the retainer collar through the valve 970 is not performed.

In position 978, a check valve allowing communication between the hydraulic retainer collar 630 and the shock absorber 612 is set forth. Thus, in position 972 the vehicle is lowered, in position 978 the vehicle is raised and in position 976 the position is maintained.

Figure 10A:
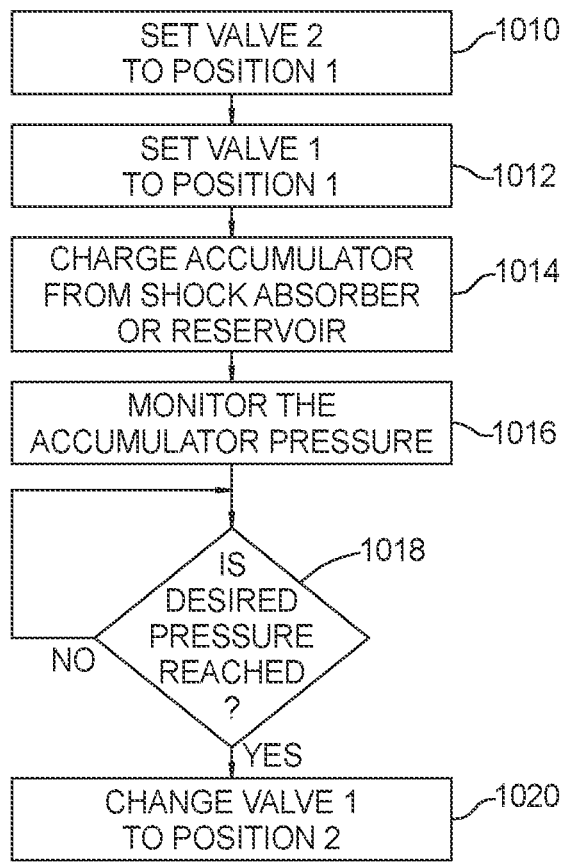
FIG. 10A is a flowchart of a method for obtaining the desired pressure within the system.

Referring now to FIG. 10A a method for operating the hydraulic circuit of FIG. 9A is set forth. In step 1010 valve 2 is set to position 2. In step 1012 the valve 2 is de-energized and set to position 2 which allows the accumulator to be charged in step 1014 by the fluid in the reservoir 941 or from the external reservoir 960 In step 1016 the pressure sensor 930 is monitored to determine the amount of pressure available at the accumulator 920. When the desired pressure is reached in step 1018, the valve 1 is changed to positon 2 in step 1020.

Figure 10B:
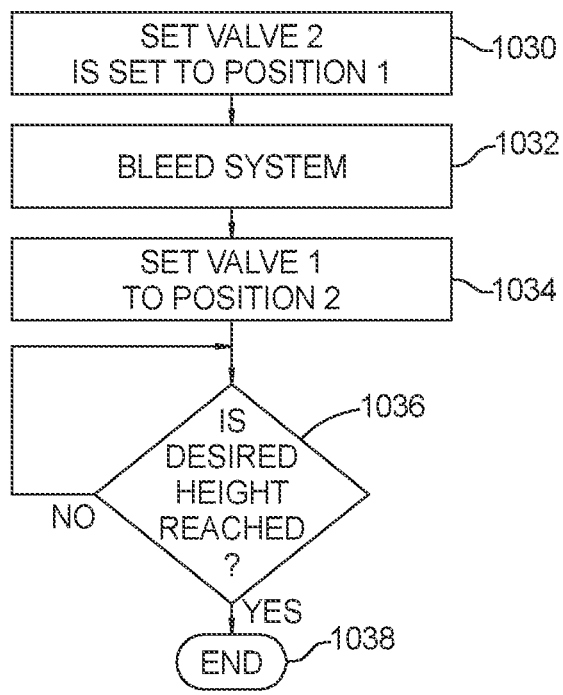
FIG. 10B is a flowchart of a method for obtaining the desired height of the vehicle (or the proper extension of the hydraulic system).

Referring now to FIG. 10B, when the system is charged and lowering the vehicle is desired. In step 1030 the second valve is set to position 1 when the accumulator 920 is charged with the fluid from the reservoir or shock absorber. In step 1032, the system is allowed to bleed pressure. In step 1034, valve 1 is set to position 2 which allows hydraulic fluid to be communicated from the accumulator 920 to the hydraulic retainer collar 630. This allows the retainer collar to be extended and increase the ride height. In step 1036 the height of the vehicle or position of the retainer collar is monitored in step 1036 when the desired height or distance is not reached step 1036 is again performed. In step 1036 when the desired height has been reached step 1038 ends the hydraulic processing within the system. Of course, the methods of FIGS. 10A and 10B may be repeated on an as needed basis or as commanded.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A suspension system for a vehicle, comprising:
a shock absorber housing having a longitudinal axis;
a spring disposed around the shock absorber housing;
a retainer collar disposed around the shock absorber housing;
an actuator engaged to the retainer collar, the actuator moves at least a portion of the retainer collar to move the spring in a direction corresponding the longitudinal axis, the actuator comprises a motor coupled to the retainer collar;
said shock absorber housing comprises first external threads and the retainer collar comprises internal threads engaging the first external threads, the motor rotating the retainer collar around the longitudinal axis so that the internal threads move relative to the first external threads and the spring moves in an axial direction, the first external threads disposed within a flanged extension disposed at a first end of the shock absorber housing,
a first seal disposed between the shock absorber housing and the retainer collar and a second seal disposed between the flanged extension and the retainer collar;
a switch generating a ride height position signal; and
a controller coupled to the actuator and the switch, said controller controlling a position of the actuator in response to the ride height position signal.

2. The suspension system as recited in claim 1 wherein the retainer collar comprises second external threads and further comprising a gear set rotatably coupling the motor and the second external threads.

3. The suspension system as recited in claim 1 wherein the switch is a virtual switch and the ride height position signal is communicated to the controller through a controller area network bus.

4. The suspension system as recited in claim 1 further comprising an atmospheric pressure sensor generating an atmospheric pressure signal, an atmospheric temperature sensor generating an atmospheric temperature signal and a load sensor generating a load signal and wherein the controller controls the actuator in response to the atmospheric pressure signal, the atmospheric temperature signal and the load signal.

5. A suspension system for a vehicle, comprising:
a sensor sensing a sensed condition at or near a shock absorber housing, said shock absorber housing having a longitudinal axis;
a spring disposed around the shock absorber housing;
a retainer collar disposed around the shock absorber housing;
an actuator engaged to the retainer collar, the actuator moves at least a portion of the retainer collar to move the spring in a direction corresponding the longitudinal axis;
said shock absorber housing comprises first external threads and the retainer collar comprises internal threads engaging the first external threads, the actuator rotating the retainer collar around the longitudinal axis so that the internal threads move relative to the first external threads and the spring moves in an axial direction, the first external threads disposed within a flanged extension disposed at a first end of the shock absorber housing, a first seal disposed between the shock absorber housing and the retainer collar and a second seal disposed between the flanged extension and the retainer collar; and a controller coupled to the actuator, said controller controlling the actuator to move the retainer collar to move the spring in response to the sensed condition.

6. The suspension system as recited in claim 5 wherein the sensor comprises an atmospheric pressure sensor generating an atmospheric pressure signal and wherein the controller controls the actuator in response to the atmospheric pressure signal.

7. The suspension system as recited in claim 5 wherein the sensor comprises an atmospheric temperature sensor generating an atmospheric temperature signal and wherein the controller controls the actuator in response to the atmospheric temperature signal.

8. The suspension system as recited in claim 5 wherein the sensor comprises a load sensor generating a load signal and wherein the controller controls the actuator in response to the load signal.

9. The suspension system as recited in claim 5 wherein the sensor comprises an atmospheric pressure sensor generating an atmospheric pressure signal, an atmospheric temperature sensor generating an atmospheric temperature signal and a load sensor generating a load signal and wherein the controller controls the actuator in response to the atmospheric pressure signal, the atmospheric temperature signal and the load signal.

10. The suspension system as recited in claim 5 wherein the sensor comprises an inertial measurement sensor generating an inertial measurement unit signal and wherein the controller controls the actuator in response to the inertial measurement signal.

11. The suspension system as recited in claim 5 wherein the sensor comprises a shock temperature sensor generating a shock temperature signal and wherein the controller controls the actuator in response to the shock temperature signal.

12. A method of controlling a suspension system of a vehicle, said suspension system comprising a shock absorber housing having a longitudinal axis, a spring disposed around the shock absorber housing and a retainer collar disposed around the shock absorber housing, an actuator engaged to the retainer collar, wherein said actuator comprises a motor coupled to the retainer collar and a first seal disposed between the shock absorber housing and the retainer collar and a second seal disposed between a flanged extension and the retainer collar, said shock absorber housing comprising first external threads and the retainer collar comprises internal threads engaging the first external threads, the first external threads disposed within a flanged extension disposed at a first end of the shock absorber housing, said method comprising:

generating a sensor signal corresponding to a sensed condition at or near the shock absorber with a sensor;

moving at least a portion of the retainer collar by way of the actuator to move the spring in a direction corresponding to the longitudinal axis;

rotating, by way of the motor, the retainer collar around the longitudinal axis based on the sensed condition so that the internal threads move relative to the first external threads; and moving the spring in the longitudinal direction in response to rotating the retainer collar.

13. The method of claim 12 wherein generating the sensor signal comprises generating an atmospheric pressure signal and an atmospheric temperature signal and wherein electrically controlling comprises electrically controlling an actuator to move the retainer collar in response to the atmospheric pressure signal and the atmospheric temperature signal.

14. The method of claim 12 wherein generating the sensor signal comprises generating a load signal and wherein electrically controlling comprises electrically controlling an actuator to mover the retainer collar in response to the load signal.

15. The method of claim 12 wherein generating the sensor signal comprises generating an atmospheric pressure signal, an atmospheric temperature signal, a load signal and wherein electrically controlling comprises electrically controlling an actuator to move the retainer collar in response to the atmospheric pressure signal, the atmospheric temperature signal and the load signal.

16. The method of claim 12 wherein generating the sensor signal comprises generating an inertial measurement signal and wherein electrically controlling comprises electrically controlling an actuator to move the retainer collar in response to the inertial measurement signal.

17. The method of claim 12 wherein generating the sensor signal comprises generating a shock temperature signal and wherein electrically controlling comprises electrically controlling an actuator to move the retainer collar in response to the shock temperature signal.

* * * * *